US009809069B2

(12) United States Patent
Hruska et al.

(10) Patent No.: US 9,809,069 B2
(45) Date of Patent: Nov. 7, 2017

(54) DRAWBAR PIN EJECTOR

(71) Applicant: AGCO Corporation, Hesston, KS (US)

(72) Inventors: Derek Hruska, Lime Springs, IA (US); Matthew Shaw, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/296,939

(22) Filed: Oct. 18, 2016

(65) Prior Publication Data

US 2017/0120705 A1     May 4, 2017

Related U.S. Application Data

(60) Provisional application No. 62/250,616, filed on Nov. 4, 2015.

(51) Int. Cl.
*B60D 1/02* (2006.01)
*B60D 1/28* (2006.01)

(52) U.S. Cl.
CPC .............. *B60D 1/025* (2013.01); *B60D 1/02* (2013.01); *B60D 1/28* (2013.01)

(58) Field of Classification Search
CPC ... B60D 1/02; B60D 1/04; B60D 1/06; B60D 1/30; B60D 1/025; B60D 1/26; B60D 1/28
See application file for complete search history.

(56) References Cited

U.S. PATENT DOCUMENTS

| 146,918 | A | * | 1/1874 | Lamb | ..................... | A63H 19/18 |
| | | | | | | 213/213 |
| 1,837,940 | A | * | 12/1931 | Ade | ........................ | B60D 1/02 |
| | | | | | | 280/508 |
| 2,827,317 | A | * | 3/1958 | Saulnier | ................... | B60D 1/02 |
| | | | | | | 403/157 |
| 4,147,374 | A | * | 4/1979 | Jeffes | ....................... | B60D 1/04 |
| | | | | | | 280/478.1 |
| 4,418,936 | A | * | 12/1983 | Adams | .................... | B64F 1/224 |
| | | | | | | 244/50 |
| 4,579,364 | A | * | 4/1986 | Kranz | ...................... | B60D 1/28 |
| | | | | | | 280/507 |

(Continued)

FOREIGN PATENT DOCUMENTS

WO     2012/025601 A     3/2012

OTHER PUBLICATIONS

Intellectual Property Office, International Search Report for related UK Application No. GB1520885, dated Apr. 25, 2016.

*Primary Examiner* — Joseph Rocca
*Assistant Examiner* — Daniel Yeagley

(57) ABSTRACT

A drawbar assembly for coupling a drawbar to a tongue of a towed implement includes a drawbar pin and a drawbar clevis having a bore configured to receive the drawbar pin. A locking plate is coupled to the drawbar clevis and movable between a pin-lock condition in which the locking plate is configured to obstruct at least a portion of the bore, and a pin-unlock condition. An ejector mechanism is configured to dislodge the drawbar pin from the bore. The ejector mechanism includes a handle utilized to operate the ejector mechanism and an ejector arm pivotably disposed in an ejector recess in the clevis. The ejector arm is movable from a home position in which the ejector arm does not interfere with the drawbar pin to an eject position in which the ejector arm forces the drawbar pin to be at least partially dislodged out of the bore.

6 Claims, 12 Drawing Sheets

(56) References Cited

U.S. PATENT DOCUMENTS

| | | | | |
|---|---|---|---|---|
| 5,427,399 A * | 6/1995 | Olson | ............... | A01B 59/042 |
| | | | | 280/508 |
| 7,429,057 B2 * | 9/2008 | Johns | ................ | B60D 1/363 |
| | | | | 280/477 |
| 8,276,931 B2 * | 10/2012 | DeKarske | ............ | B60D 1/06 |
| | | | | 280/507 |
| 9,004,557 B2 * | 4/2015 | Knox | .................... | B66C 1/36 |
| | | | | 294/82.11 |
| 2004/0119263 A1 | 6/2004 | Kollath | | |
| 2007/0145719 A1 | 6/2007 | Heitlinger | | |
| 2009/0058042 A1 | 3/2009 | Tveito | | |
| 2013/0154236 A1 * | 6/2013 | Shaw | ................ | B60D 1/28 |
| | | | | 280/515 |
| 2015/0054259 A1 * | 2/2015 | Smith | ................ | B60D 1/30 |
| | | | | 280/515 |

\* cited by examiner

DRAWBAR PIN EJECTOR

CROSS REFERENCE TO RELATED APPLICATION

This application claims the benefit of U.S. Provisional Application No. 62/250,616 filed Nov. 4, 2015, which is hereby incorporated by reference in its entirety.

BACKGROUND

Field of Invention

The present invention relates generally to drawbars for coupling an implement to a vehicle, and more particularly, to drawbar pin ejector devices.

Description of Related Art

Drawbars are commonly used to couple implements to agricultural vehicles, such as tractors. For example, a drawbar may have a clevis arranged to receive a tongue of an implement to be towed. The clevis and tongue may have bores through which a drawbar pin is inserted to couple the drawbar and tongue together.

While attaching and detaching drawbar pulled implements to a tractor, the drawbar pin may become stuck and be difficult to pull out from its housing. It would be desirable to have a drawbar coupling system that partially ejects the drawbar pin from the clevis to allow it to be removed more easily from the clevis.

OVERVIEW OF THE INVENTION

In one aspect, the invention is directed to a drawbar assembly for coupling a drawbar to a tongue of a towed implement. The drawbar assembly includes a drawbar pin and a drawbar clevis having a bore configured to receive the drawbar pin. A locking plate is movably coupled to the drawbar clevis, wherein the locking plate is movable between a pin-lock condition wherein the locking plate is configured to obstruct at least a portion of the bore, and a pin-unlock condition. The drawbar assembly also includes an ejector mechanism configured to dislodge the drawbar pin from the bore. The ejector mechanism includes a handle utilized to operate the ejector mechanism and an ejector arm pivotably disposed in an ejector recess in the clevis. The ejector arm is movable from a home position in which the ejector arm does not interfere with the drawbar pin to an eject position in which the ejector arm forces the drawbar pin to be at least partially dislodged out of the bore in the clevis.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
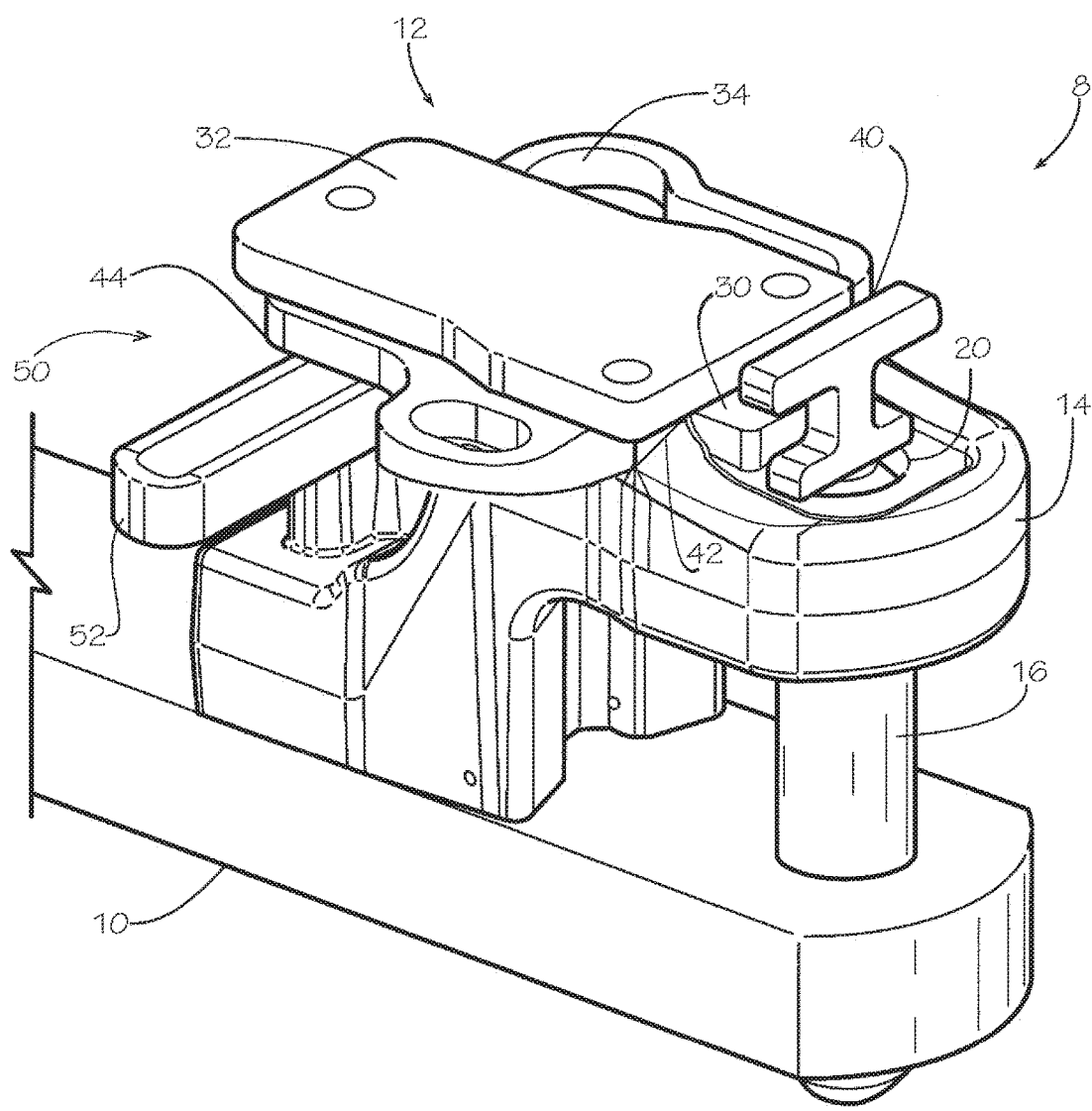
FIG. 1 shows a perspective view of a drawbar assembly with a drawbar pin ejection mechanism according to one embodiment of the invention.
Figure 2:
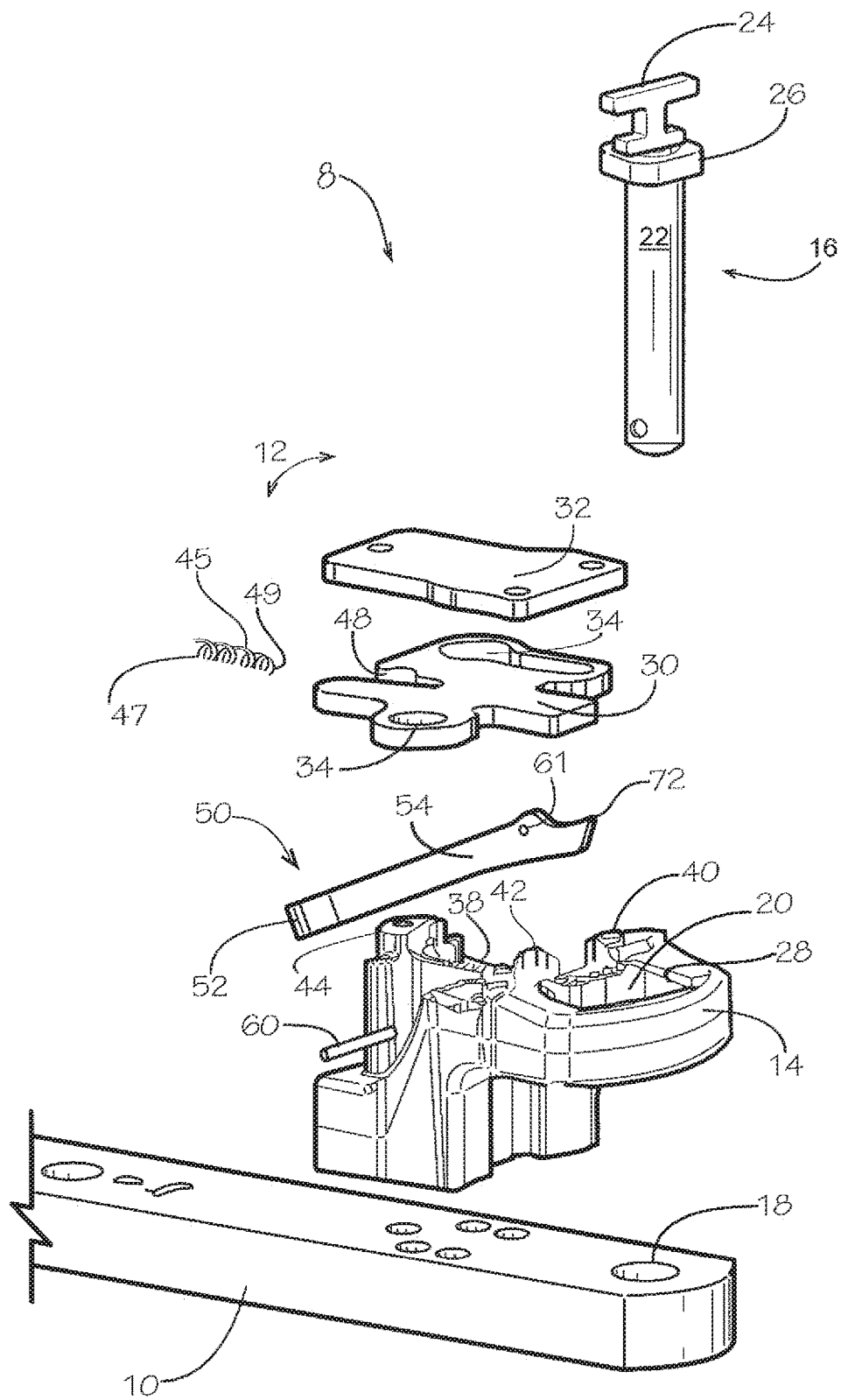
FIG. 2 shows an exploded view of the drawbar assembly of FIG. 1.

Turning to the figures wherein like numbers represent like elements throughout the several views, FIG. 1 shows a drawbar assembly 8 including a drawbar 10 and a drawbar pin retention device 12. The drawbar 10 may have a clevis 14 configured to receive a drawbar pin 16. As best seen in the exploded view of FIG. 2, the drawbar 10 and clevis 14 each have a bore 18, 20 respectively through which the drawbar pin 16 may be inserted. The clevis 14 receives a tongue (not shown) of an implement. The tongue includes a bore configured for alignment with the bores 18, 20 so that when the tongue is inserted into the clevis 14, the drawbar pin 16 extends through the clevis 14, the tongue, and the drawbar 10, thereby coupling the tongue to the drawbar 10.

The drawbar pin 16 comprises a generally cylindrically shaped member 22 having a handle 24 at an upper end and a shoulder 26. The bore 20 may include a shoulder recess 28 for receiving the shoulder 26 of the drawbar pin 16. Contact between the shoulder 26 of the drawbar pin 16 with the clevis 14 prevents the drawbar pin 16 from falling through the bore 20.

Figure 3:
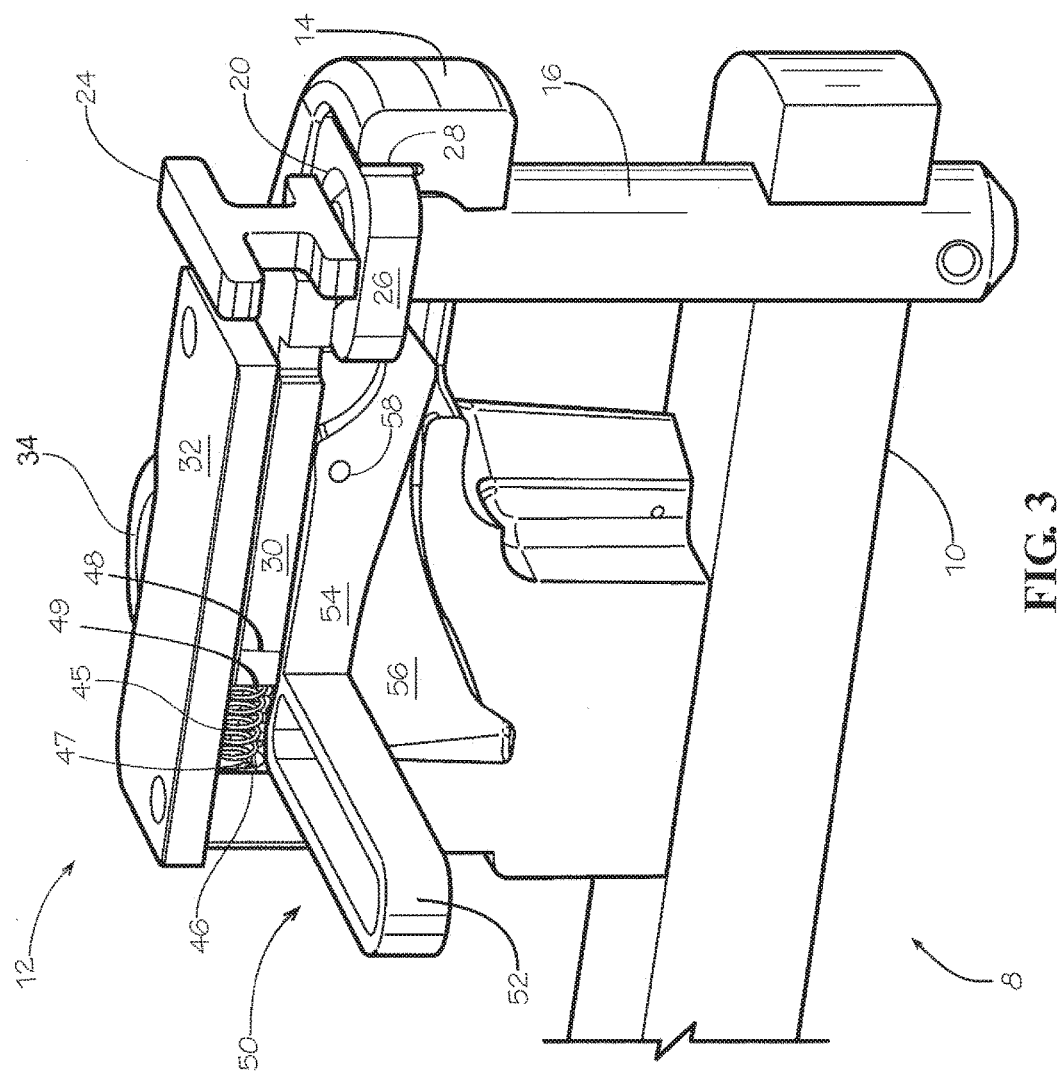
FIG. 3 shows a cutaway view of the drawbar assembly of FIG. 1.
Figure 4:
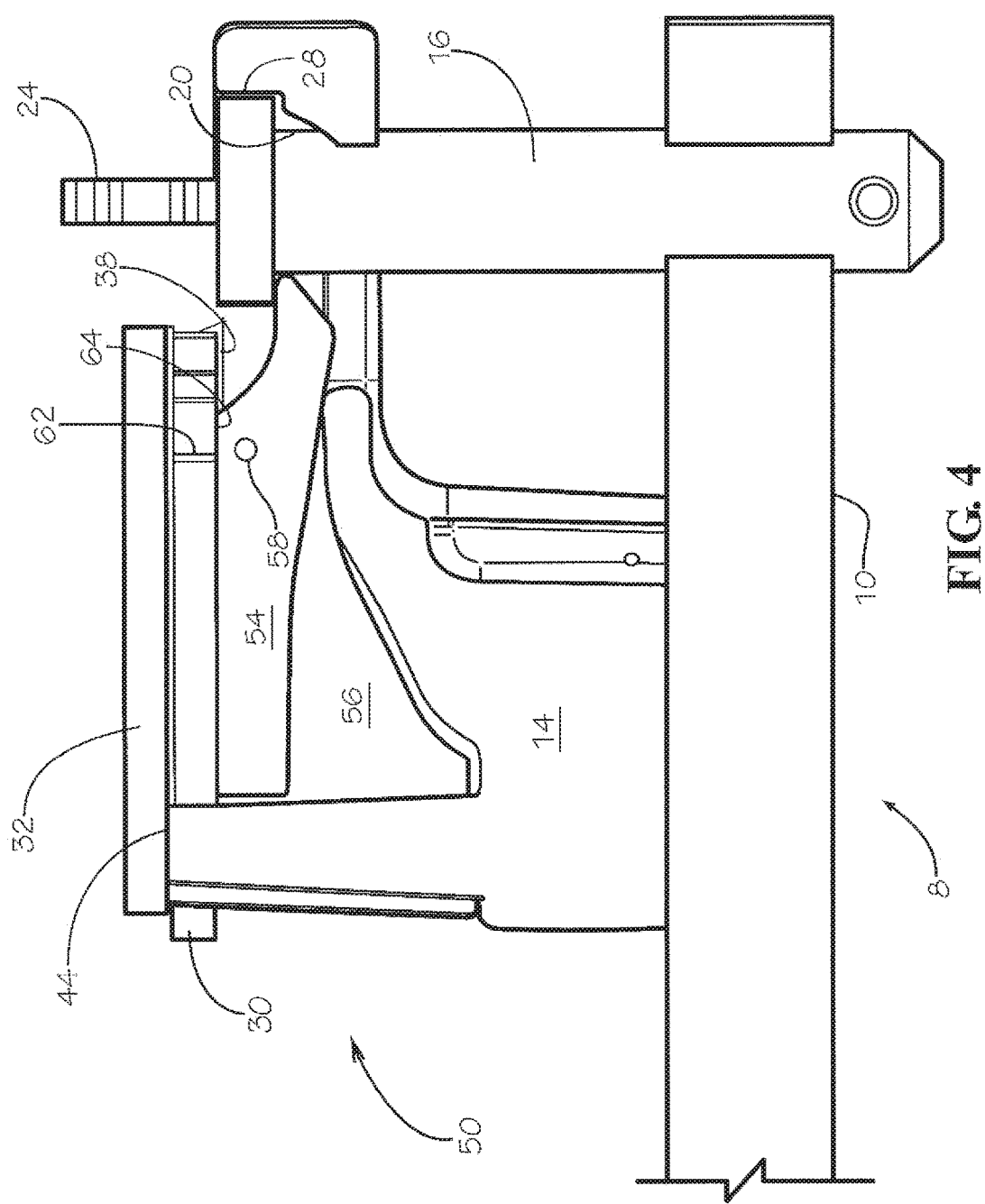
FIG. 4 is a sectional view of the drawbar assembly of FIG. 1 with a locking plate in a pin-unlock position and the ejector arm in a home position.
Figure 5:
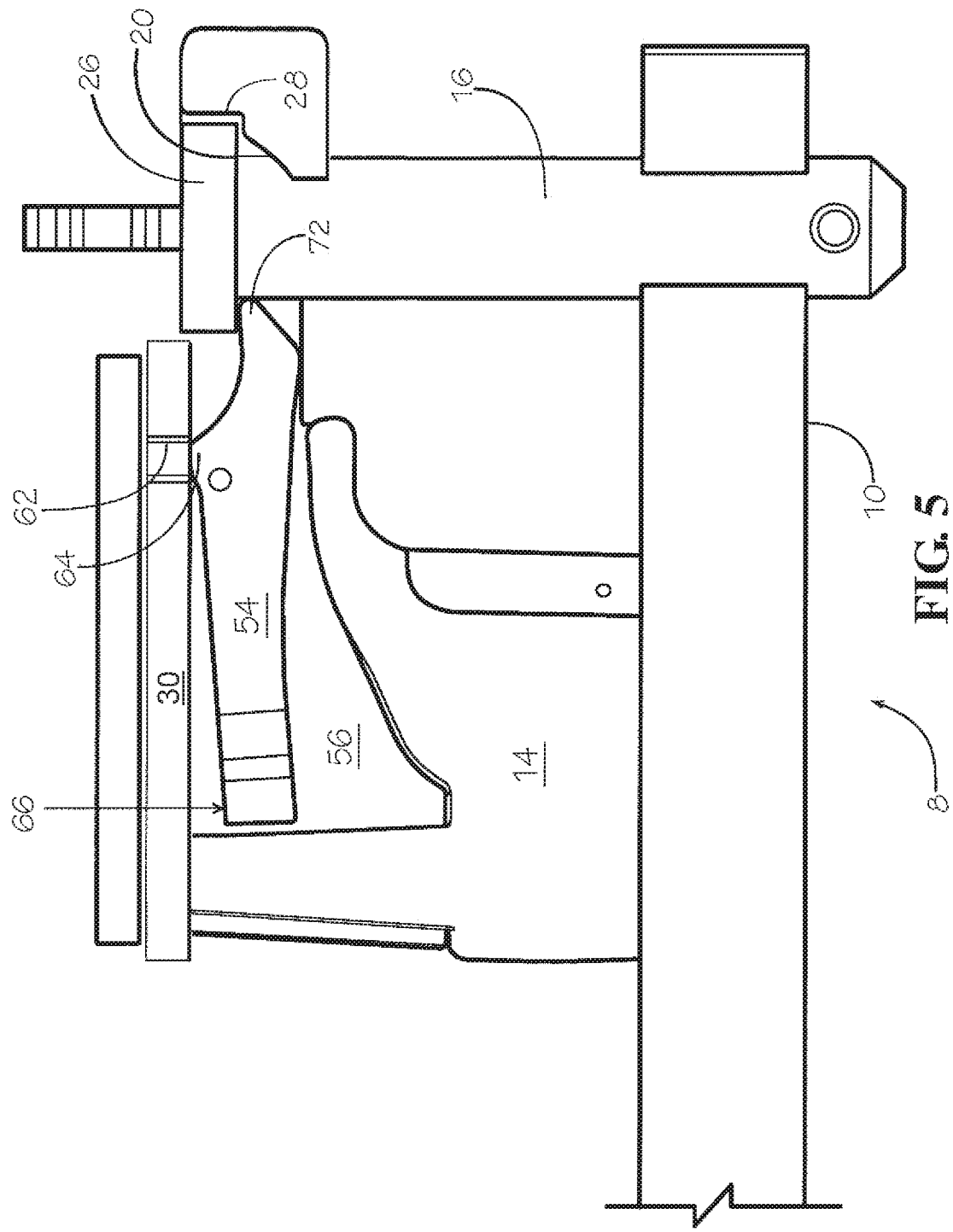
FIG. 5 is a sectional view of the drawbar assembly of FIG. 1 with the ejector arm moving to an eject position.
Figure 6:
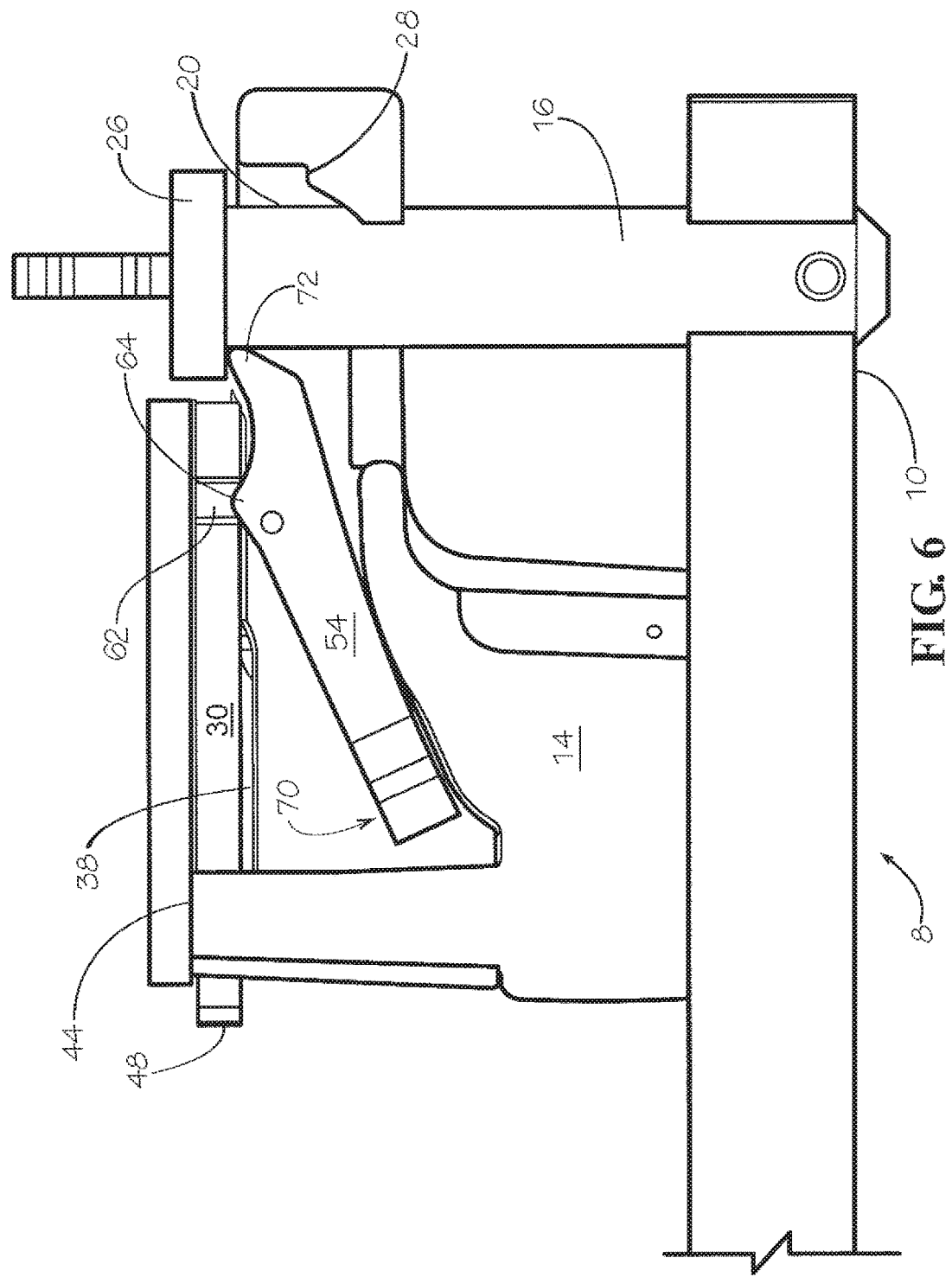
FIG. 6 is a sectional view of the drawbar assembly of FIG. 1 with the ejector arm in the eject position.

The drawbar pin retention device 12 contains a locking plate 30 that is movably coupled to the clevis 14 and configured to move between a pin-lock condition (FIGS. 1 and 3) and a pin-unlock condition (FIGS. 4-6). In an example embodiment, the locking plate 30 may be movable between the pin-lock condition in which the locking plate 30 covers a sufficient portion of the drawbar bore 20 to prevent removal of a drawbar pin 16 within the bore 20 (or insertion of the drawbar pin 16 into the bore 20) and the pin-unlock condition in which the locking plate 30 is positioned to allow removal of the drawbar pin 16 from the bore 20 (or insertion into the bore 20). An upper retaining plate 32 is mounted above the locking plate 30 coupling the locking plate 30 to the clevis 14 and assisting in preventing debris from affecting the locking plate 30. The locking plate 30 may be provided with one or more handles 34 to assist a user in grasping the locking plate 30 and moving the locking plate 30 from the pin-lock condition in which the bore 20 is at least partially covered to pin-unlock condition in which the bore 20 is uncovered. The handles 34 may extend out beyond the upper retaining plate 32 and the clevis 14 to allow for easy grasping by an operator.

The drawbar clevis 14 may be arranged to accommodate and facilitate movement of the locking plate 30. For example, the clevis 14 may be configured to have a generally flat surface 38 upon which the locking plate 30 rests and an arrangement of raised mounts 40, 42, 44 that provide a path through which the locking plate 30 moves and limits movement of the locking plate 30. The mounts 40, 42, 44 may extend a height above the flat surface 38 such that there is sufficient space between the upper retaining plate 32 and the flat surface 38 to allow for the movement of the locking plate 30.

In an example embodiment, the locking plate 30 is arranged as a spring-loaded mechanism in which a spring 45 urges the locking plate 30 to the pin-locked position such that the locking plate 30 is biased to the pin-locked position. The spring 45 may be positioned between the clevis 14 and the locking plate 30 so as to urge the locking plate 30 over the bore 20 to the pin-locked position. In one example embodiment, the drawbar clevis 14 may have a stop 46 for engaging a first end 47 of the spring 45. For example, the stop 46 is a raised portion that serves as a push wall against which the first end 47 of the spring 45 pushes. The locking plate 30 may have a recess 48 for receiving a second end 49 of the spring 45. In this arrangement, the spring 45 pushes the locking plate 30 toward the bore 20. Thus, the spring 45 pushes the locking plate 30 to the pin-locked position, in which the locking plate 30 is positioned over a portion of the bore 20 to cover the shoulder 26 of the drawbar pin 16 within the shoulder recess 28.

According to the invention, the drawbar assembly 8 has an ejector mechanism 50 used to help dislodge the drawbar pin 16 from the bore 20. The ejector mechanism 50 has a handle 52 utilized to operate the ejector mechanism 50 and an ejector arm 54 pivotably disposed in an ejector recess 56 in the clevis 14 with a pivot mechanism 58. In the illustrated embodiment, the pivot mechanism 58 comprises a pivot rod 60 that extends through a pivot bore 61 in the ejector arm 54 and held by the clevis 14. However, one skilled in the art will understand that other means may be used to control the pivoting movement of the ejector arm 54 using sound engineering judgment without departing from the scope of the invention. The ejector arm 54 is moved from a home position as shown in FIG. 4 in which the ejector arm 54 does not interfere with the drawbar pin 16 to an eject position as shown in FIG. 6 in which the ejector arm 54 forces the drawbar pin 16 to be at least partially dislodged out of the bore 20 in the clevis 14.

Desirably, the locking plate 30 must be manually slid back into its pin-unlocked position before the ejector arm 54 can be pivoted to the eject position. In one embodiment, the locking plate 30 contains a groove [[62]]63 formed therein and the ejector arm 54 has a catch 64 formed thereon configured to interact with the ejector arm 54. When the locking plate 30 is in its pin-lock position, the catch 64 contacts the locking plate 30 thereby preventing the ejector arm 54 from moving from the home position as shown in FIG. 3. When the locking plate 30 is moved to the pin-unlock position, the groove 62 aligns with the catch 64 permitting the ejector arm 54 to begin moving toward the eject position as indicated by the arrow 66 in FIG. 5. After the ejector arm 54 reaches a position where the catch 64 moves into the groove 62 of the locking plate 30, the locking plate 30 can be released as the catch 64 continues to hold the locking plate 30 in the pin-unlock position. As the ejector arm 54 is rotated fully to the eject position as shown by the arrow 70 in FIG. 6, a toe 72 of the ejector arm 54 pushes up on the shoulder 26 of the drawbar pin 16 and at least partially dislodges the drawbar pin 16 out of the shoulder recess 28 of the bore 20.

The ejector mechanism can have multiple functions such as preventing the latch from closing while ejecting and acting as a trip for when the implement is being hooked up.

Figure 10:
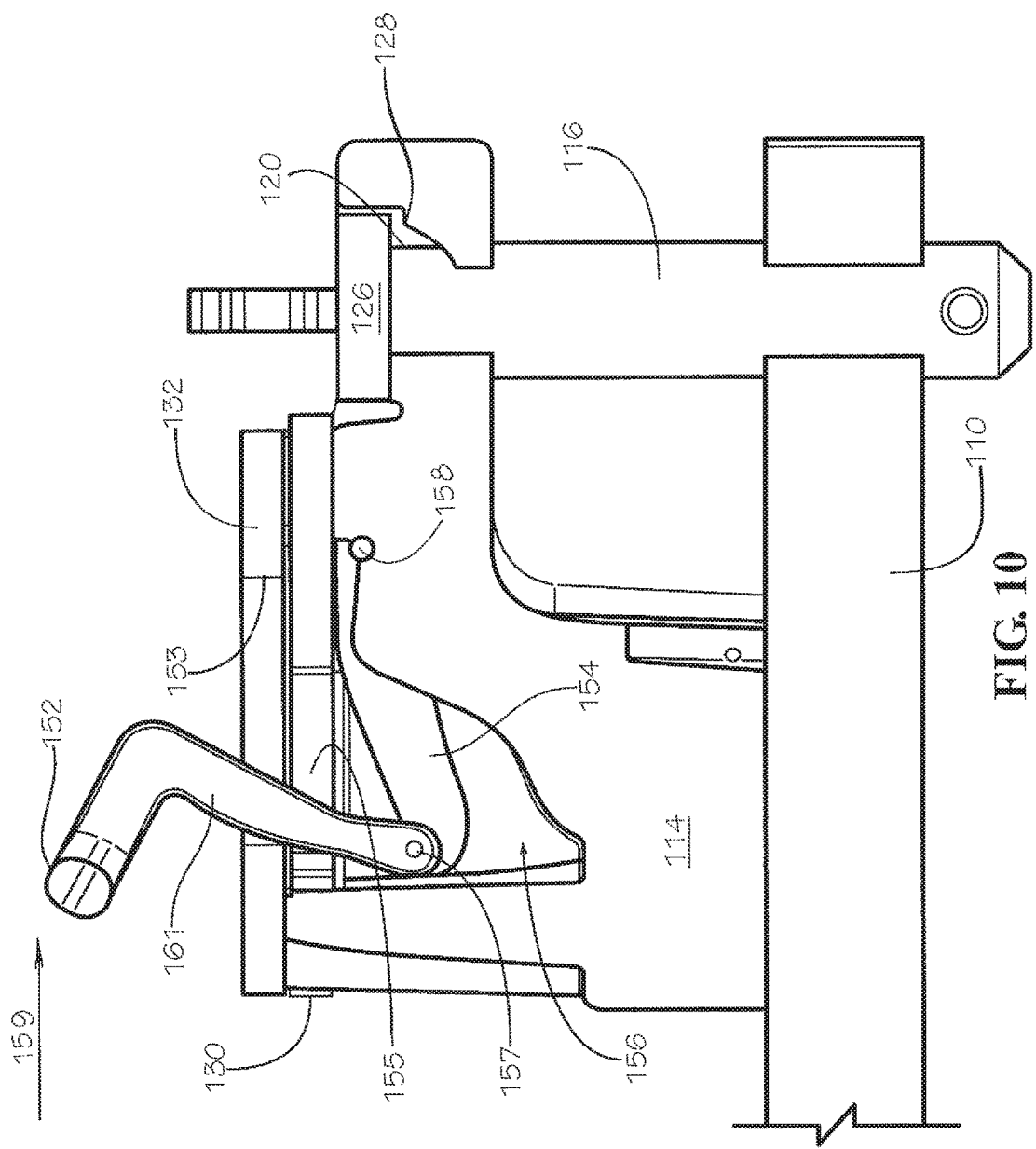
FIG. 10 is a sectional view of the drawbar assembly of FIG. 7 with a locking plate in a pin-unlock position and the ejector arm in a home position.
Figure 11:
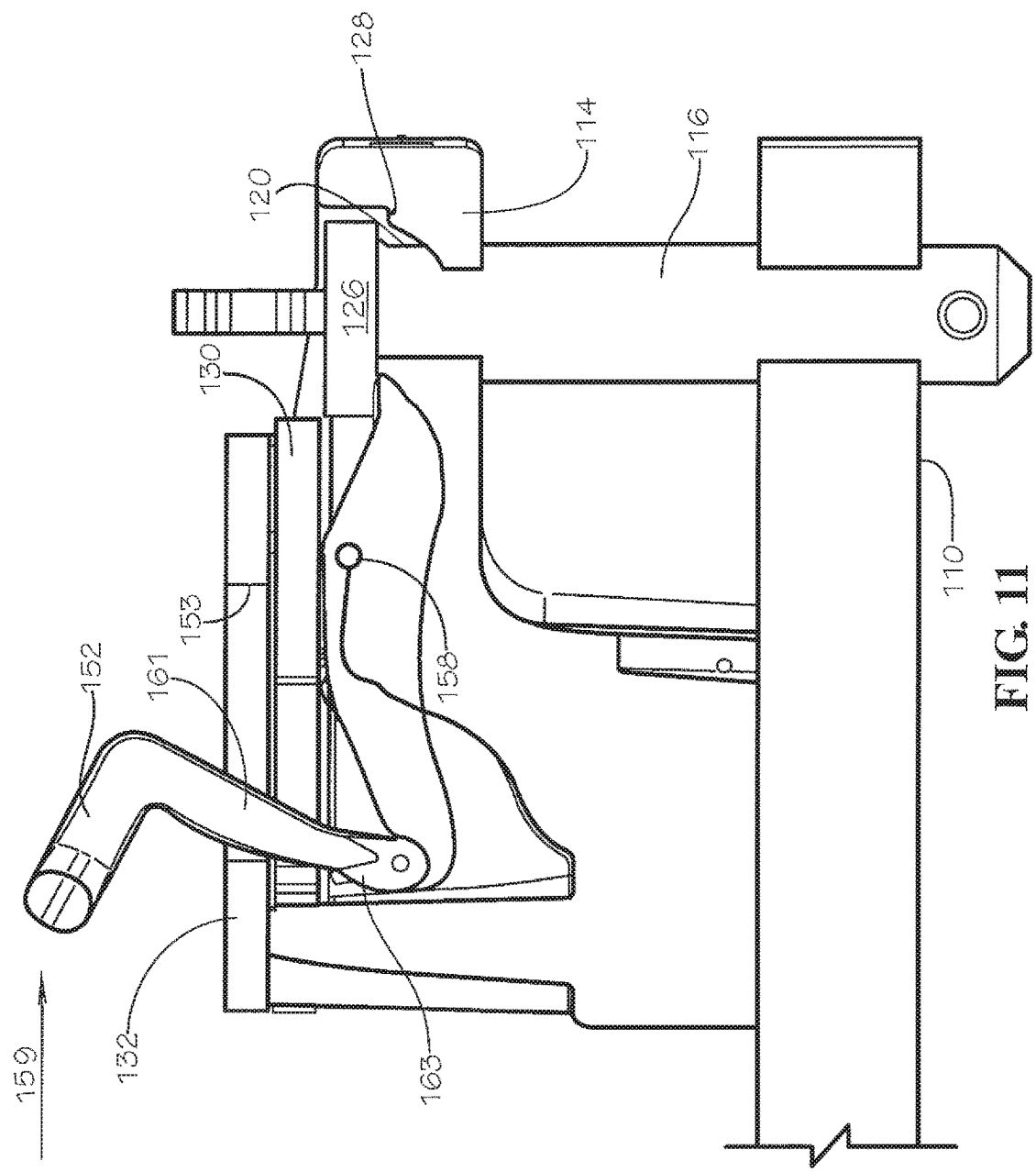
FIG. 11 is a close-up sectional view of the drawbar assembly of FIG. 7.
Figure 12:
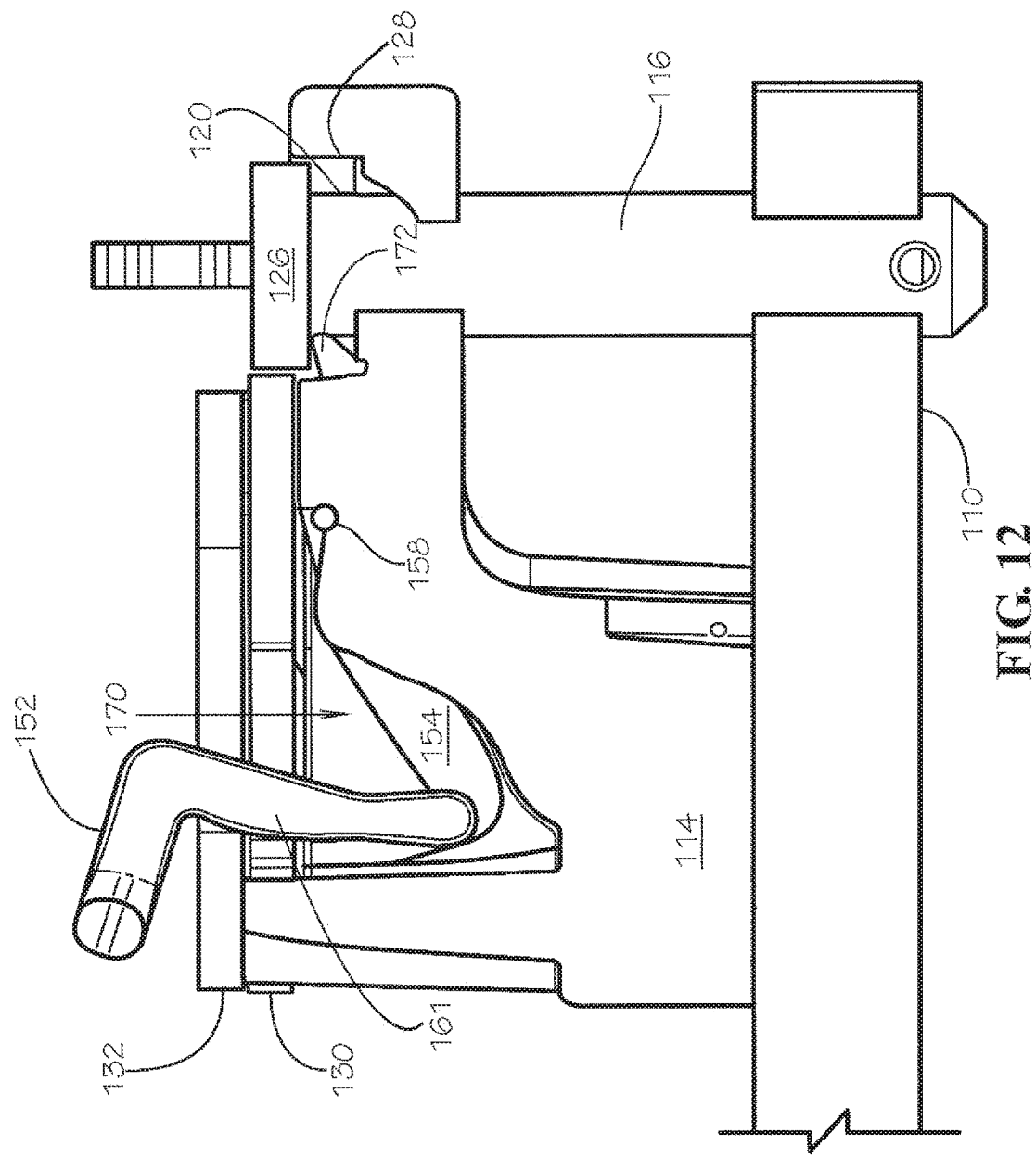
FIG. 12 is a sectional view of the drawbar assembly of FIG. 7 with the ejector arm in the eject position.

Turning now to FIGS. 7-12, a second embodiment of a drawbar assembly 108 with an ejector mechanism 150 is shown. The drawbar assembly 108 has a drawbar 110 and a drawbar pin retention device 112 similar to the one described above. The drawbar pin retention device 112 contains a locking plate 130 that is movably coupled to the clevis 114 and configured to move between a pin-lock condition (FIGS. 7 and 9) and a pin-unlock condition (FIGS. 10-12). Desirably, the locking plate 130 is biased to the pin-lock condition by a spring 145. A handle 152 of the ejector mechanism 150 is used to accomplish both actions of retracting the locking plate 130 to the pin-unlock position and ejecting drawbar pin 116 with ejector arm 154.

Figure 7:
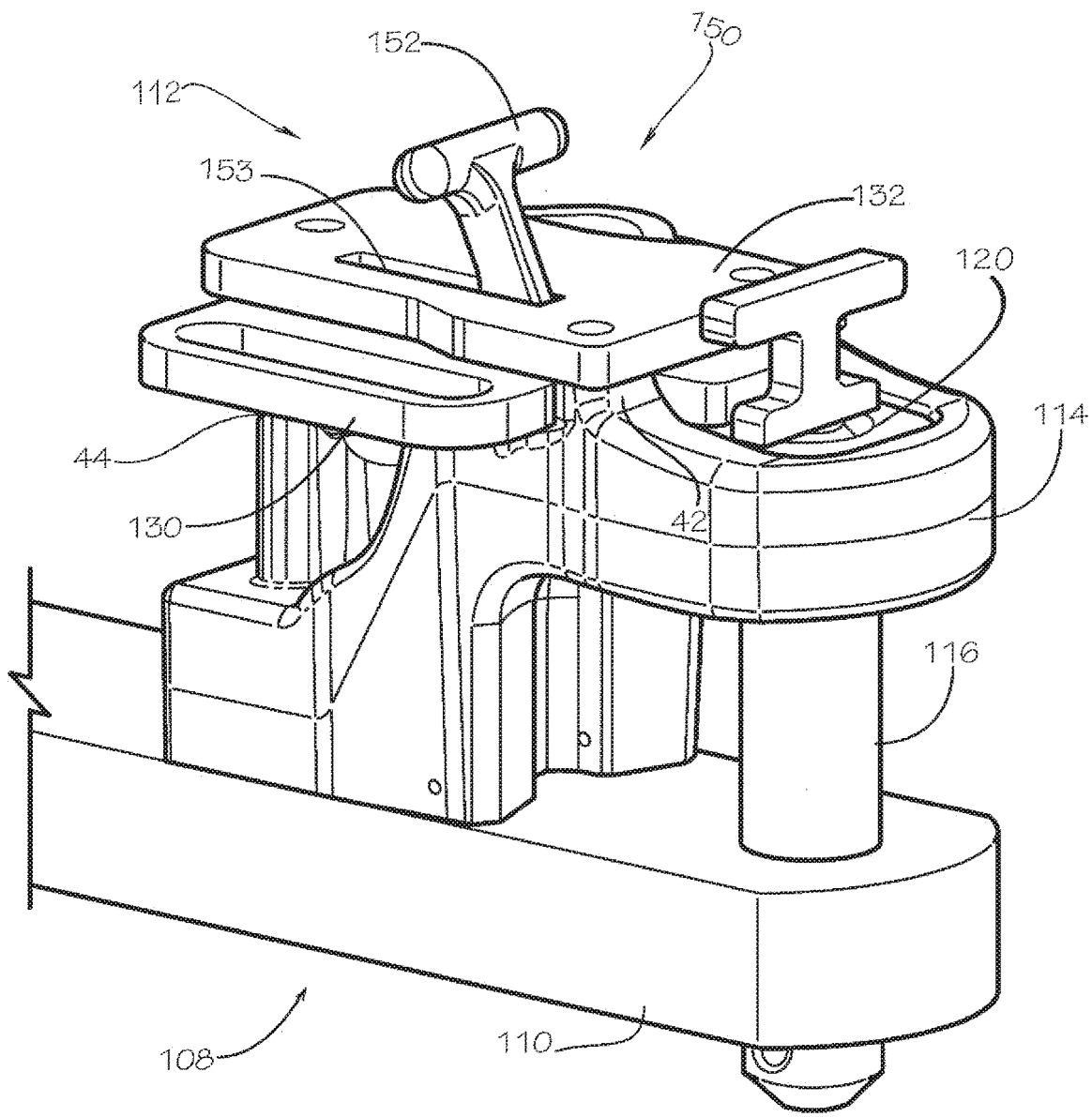
FIG. 7 shows a perspective view of a drawbar assembly with a drawbar pin ejection mechanism according to another embodiment of the invention.
Figure 8:
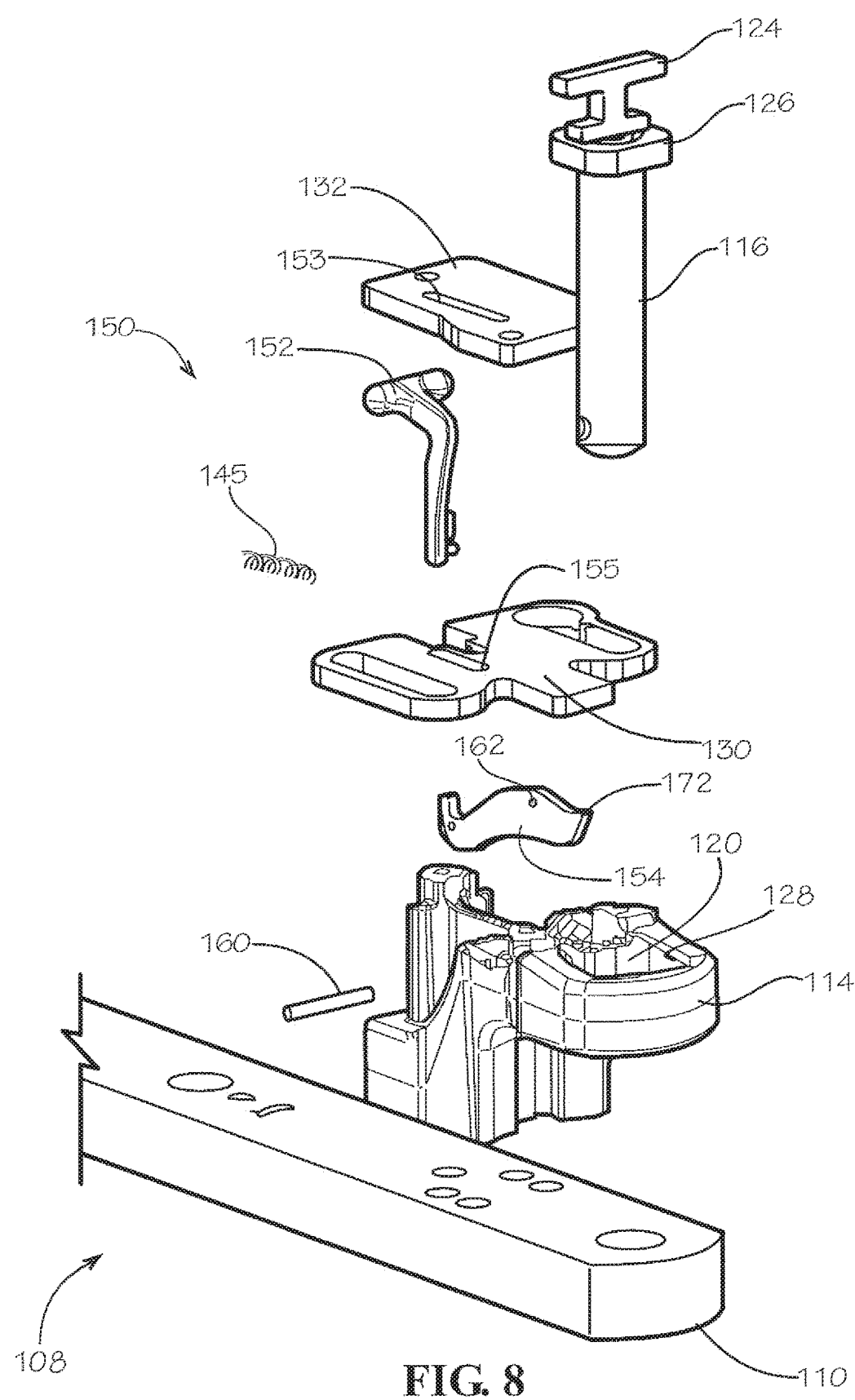
FIG. 8 shows an exploded view of the drawbar assembly of FIG. 7.
Figure 9:
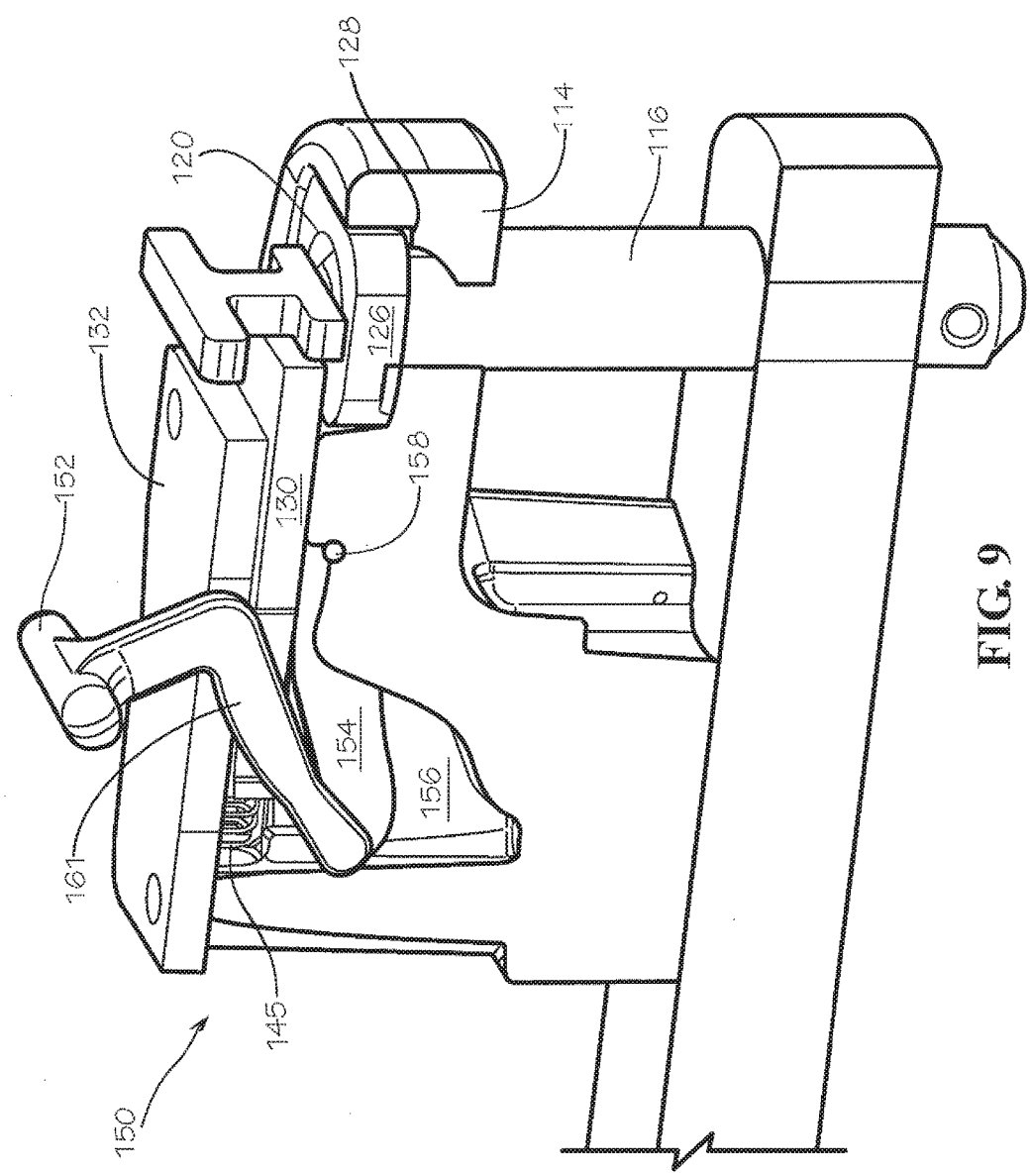
FIG. 9 shows a cutaway view of the drawbar assembly of FIG. 7.

As best seen in FIG. 7, the handle 152 extends through a first slot 153 in the upper retaining plate 132 and an aligning but shorter second slot 155 (FIG. 8) in the locking plate 130. The handle 152 utilized to operate the ejector mechanism 150 is connected to an ejector arm 154 pivotably disposed in an ejector recess 156 in the clevis 114 with a pivot mechanism 158. The handle 152 is pivotably attached to the ejector arm 154 about handle pivot 157 such that initial movement of the handle as indicated by arrow 159 causes a handle stem 161 to contact the locking plate 130 at the end of the second slot 155 and move the locking plate to the pin-unlock position as shown in FIG. 10. At the end of the rotation of the handle 152, a handle end lock 163 engages as shown in FIG. 11. The handle is then pushed down as shown in FIG. 12 to pivot the ejector arm 154 to dislodge the drawbar pin 116. In the illustrated embodiment, the pivot mechanism 158 comprises a pivot rod 160 (FIG. 8) that extends through a pivot bore 162 (FIG. 8) in the ejector arm 154 and held by the clevis 114. However, one skilled in the art will understand that other means may be used to control the pivoting movement of the ejector arm 154 using sound engineering judgment without departing from the scope of the invention. The ejector arm 154 is moved from a home position as shown in FIG. 11 in which the ejector arm 154 does not interfere with the drawbar pin 116 to an eject position as shown by arrow 170 in FIG. 12 in which the ejector arm 154 forces the drawbar pin 116 to be at least partially dislodged out of the bore 120 in the clevis 114. As the ejector arm 154 is rotated fully to the eject position as shown in FIG. 12, a toe 172 of the ejector arm 154 pushes up on the shoulder 126 of the drawbar pin 116 and at least partially dislodges the drawbar pin 116 out of the shoulder recess 128 of the bore 120.

Various examples have been set forth herein to provide an understanding of the invention, but the invention is not limited to the example embodiments and additional embodiments will occur to those skilled in the art. Although the invention has been discussed with respect to specific embodiments, thereof, the embodiments are merely illustrative, not restrictive of the invention. Numerous specific details are provided, such as examples of components and methods, to provide a thorough understanding of the invention. One skilled in the relevant art will recognize, however, that an embodiment of the invention can be practiced without one or more of the specific details, or with other apparatus, systems, methods, components and/or the like.

What is claimed is:

1. A drawbar assembly for coupling a drawbar to a tongue of a towed implement, the drawbar assembly comprising:
    a drawbar pin;
    a drawbar clevis having a bore configured to receive the drawbar pin;
    a locking plate movably coupled to the drawbar clevis, wherein the locking plate is movable between a pin-lock condition wherein the locking plate is configured to obstruct at least a portion of the bore, and a pin-unlock condition;
    an upper retaining plate mounted above the locking plate coupling the locking plate to the clevis and assisting in preventing debris from affecting the locking plate; and
    an ejector mechanism configured to dislodge the drawbar pin from the bore, the ejector mechanism comprising:
        a handle utilized to operate the ejector mechanism, wherein the handle extends through a first slot in the upper retaining plate and an aligning but shorter second slot in the locking plate; and
        an ejector arm pivotably disposed in an ejector recess in the clevis, wherein the ejector arm is movable from a home position in which the ejector arm does not interfere with the drawbar pin to an eject position in which the ejector arm forces the drawbar pin to be at least partially dislodged out of the bore in the clevis.

2. The drawbar assembly of claim 1 wherein the locking plate must be slid back into a pin-unlocked position before the ejector arm can be pivoted to the eject position.

3. The drawbar assembly of claim 1 wherein a toe of the ejector arm pushes up on a shoulder of the of the drawbar pin and at least partially dislodges the drawbar pin out of a shoulder recess of the bore.

4. The drawbar assembly of claim 1 wherein the pivot ejector arm is mounted in the ejector recess with a pivot mechanism, the pivot mechanism comprising a pivot rod that extends through a pivot bore in the ejector arm and held by the clevis.

5. The drawbar assembly of claim 1 wherein the handle is pivotably attached to the ejector arm such that initial movement of the handle causes a handle stem to contact the locking plate at an end of the second slot and move the locking plate to the pin-unlock position.

6. The drawbar assembly of claim 1, wherein the handle is pushed down to pivot the ejector arm to dislodge the drawbar pin.

\* \* \* \* \*